United States Patent [19]

Door et al.

[11] Patent Number: 5,395,705
[45] Date of Patent: Mar. 7, 1995

[54] ELECTROCHEMICAL CELL HAVING AN ELECTRODE CONTAINING A CARBON FIBER PAPER COATED WITH CATALYTIC METAL PARTICLES

[75] Inventors: Robert D. Door, Clute, Tex.; Glenn A. Eisman, Midland, Mich.

[73] Assignee: The Dow Chemical Company, Midland, Mich.

[21] Appl. No.: 170,661

[22] Filed: Dec. 20, 1993

Related U.S. Application Data

[63] Continuation of Ser. No. 14,011, Feb. 5, 1993, abandoned, which is a continuation of Ser. No. 576,573, Aug. 31, 1990, abandoned, Continuation of Ser. No. 14,011, Feb. 5, 1993, abandoned, which is a continuation of Ser. No. 576,573, Aug. 31, 1990, abandoned.

[51] Int. Cl.$^6$ .................... H01M 4/88; H01M 8/04
[52] U.S. Cl. ......................... 429/42; 429/30; 429/33; 429/41; 429/44; 429/192; 502/101
[58] Field of Search .................. 429/30, 33, 41, 42, 429/44, 192; 502/101

[56] References Cited

U.S. PATENT DOCUMENTS

| | | | |
|---|---|---|---|
| 3,297,484 | 1/1967 | Niedrach | 136/86 |
| 3,432,355 | 3/1969 | Niedrach et al. | 136/86 |
| 3,933,684 | 1/1976 | Petrow et al. | 502/101 |
| 4,166,143 | 8/1979 | Petrow et al. | 427/115 |
| 4,457,953 | 7/1984 | McIntyre et al. | 427/113 |
| 4,751,062 | 6/1988 | Kaufman et al. | 429/41 |
| 4,752,370 | 6/1988 | McMichael et al. | 204/283 |
| 4,810,594 | 3/1989 | Bregoli et al. | 429/13 |
| 4,851,377 | 7/1989 | Breault | 502/101 |
| 4,894,355 | 1/1990 | Takeuchi et al. | 429/42 |
| 5,308,711 | 5/1994 | Passaniti et al. | 429/42 |
| 5,314,760 | 5/1994 | Tsou et al. | 429/44 |

*Primary Examiner*—Anthony McFarlane

[57] ABSTRACT

An electrochemical cell having at least one electrode containing a carbon fiber paper coated with an uncoagulated mixture of binder and catalytically active metal particles provides superior voltage characteristics at catalyst/binder ratios of about 2/1 to about 25/1.

22 Claims, No Drawings

ELECTROCHEMICAL CELL HAVING AN ELECTRODE CONTAINING A CARBON FIBER PAPER COATED WITH CATALYTIC METAL PARTICLES

This is a continuation of application Ser. No. 08/014,011, filed on Feb. 5, 1993, now abandoned, which is a continuation of Ser. No. 07/576,573, filed on Aug. 31, 1990, now abandoned.

BACKGROUND OF THE INVENTION

1. Field of the Invention

This invention relates to electrodes for electrochemical cells such as electrolytic and galvanic cells.

2. Description of the Prior Art

Fuel cells are devices for directly converting the chemical energy of a fuel into electrical power. Generally, a fuel cell comprises two gas diffusion electrodes (an anode and a cathode) and an electrolyte impregnated matrix between the two electrodes. A catalyst layer is present on the electrolyte facing surface of each electrode. In operation, a typical fuel cell is fed with a hydrogen containing gas at the anode and an oxygen-containing gas is fed to the cathode. The gas is diffused through the electrodes to react at catalyst sites to yield water, heat and electrical energy. On the anode side of the fuel cell, hydrogen is electrochemically oxidized to give electrons. The electrical current so generated is conducted from the anode through an external circuit to the cathode. On the cathode side of the cell, the electrons are electrochemically combined with oxygen. A flow of ions through the electrolyte completes the circuit.

There is a constant search for ways in which to improve fuel cell performance. Even slight increases in performance can make the difference between a fuel cell which fills specific requirements in comparison with one which does not. In addition, there is a constant search for ways in which the cost of producing the elements of a fuel cell can be reduced. Specifically, the methods of fabricating fuel cell electrodes have involved various procedures which generally are not suitable to automated production.

In U.S. Pat. No. 4,272,353, a method of making electrodes using a solid polymer electrolyte base member and catalyst is disclosed. The catalyst is deposited upon the surface of the solid polymer electrolyte base member, the surface of which has been previously toughened by suitable abrading means. The catalyst is in the form of metal particles which are subsequently fixed upon the toughened surface by the use of pressure, heat, adhesive, binder, solvent, electrostatic means, etc.

In U.S. Pat. No. 4,810,594, fuel cell electrodes are prepared by the deposition of a hydrophobic polymer and electrocatalyst layer on the surface of a porous electrode substrate which is thereafter press-sintered. Carbon fiber paper substrates are preferred in the preparation of the fuel cell electrodes. The catalyst is a catalyzed carbon particle prepared from a noble metal which is dispersed upon graphitized carbon black. The catalyzed carbon particles are blended with a hydrophobic polymer binder in an aqueous mixture. Prior to coating the catalyst/binder mixture onto the carbon fiber paper substrate, the aqueous suspension of catalyzed carbon particles is flocculated, for example, by heating or by the addition of a flocculating agent. Other references showing the preparation of electrodes comprising carbon fiber paper are: U.S. Pat. Nos. 4,349,428; 4,248,682; 4,647,359; and 4,293,396.

In U.S. Pat. Nos. 3,432,355 and 3,297,484, electrodes for fuel cells are disclosed which are prepared by first casting a film from an aqueous emulsion of polytetrafluoroethylene onto a casting surface, sintering the polytetrafluoroethylene and, thereafter, spreading thereon a film of a mixture of catalytic metal particles and polytetrafluoroethylene. This process necessitates a batch system of preparation.

In U.S. Pat. No. 4,166,143, fuel cell electrodes are disclosed as being prepared by the application of a flocculated mixture of a platinum-on-carbon electrocatalyst in admixture with a dispersion of polytetrafluoroethylene.

In U.S. Pat. No. 4,752,370, membrane/electrode assemblies are disclosed in which catalyst particles in admixture with a binder are deposited upon an ion exchange membrane from a slurry of catalytically active particles, optionally containing a binder. The binder can be a fluoropolymer, such as polytetrafluoroethylene and the solution/dispersion can be formed utilizing a solvent for the particularly preferred ion exchange fluoropolymer utilized as a binder. The catalytically active particles are disclosed as being applied to the ion exchange membrane utilizing metering bars, metering knives, or metering rods. Usually, the coatings on the ion exchange membrane of the catalyst are built up to the thickness desired by repetitive coating application.

SUMMARY OF THE INVENTION

A novel process is disclosed for the preparation of a novel electrode for an electrochemical cell. The method is particularly applicable to the preparation of electrodes utilizing automated mass production techniques in that the layer of catalytic metal particles/binder can be applied in single or successive layers, on a continuous basis, to a web of wet proofed carbon fiber paper. Subsequently, the wet proofed carbon fiber paper coated with a catalytic layer is bonded to an ion exchange membrane utilizing heat and/or pressure.

The novel electrode is particularly adapted for use in fuel cells and in the preparation of solid polymer electrodes. For use in electrolytic cells, the binder selected for binding the metal catalyst particles to the carbon fiber paper is a hydrophilic binder or a hydrophobic binder such as a fluorinated hydrocarbon resin. For use in galvanic electrochemical cells, the binder is selected from hydrophobic resins.

Also disclosed is a novel electrochemical cell, a novel membrane and electrode assembly, and a novel method of generating an electric current in a fuel cell.

DETAILED DESCRIPTION OF THE INVENTION

This invention is based upon the discovery of a novel catalytic carbon fiber paper electrode assembly, useful in the preparation of electrodes and membrane assemblies for electrochemical cells, preferably, fuel cells, most preferably, fuel cells having means for supplying a stream of oxidant gas to one electrode element and a stream of a fuel gas to the other of said electrode elements. The electrode can be prepared on a continuous basis utilizing automated, mass production coating methods. An improved electrode exhibiting superior, reproducible voltage characteristics is obtained. By the method of the invention, a wet proofed carbon fiber paper, which serves as a current collector, can be coated from an aqueous dispersion of catalytic metal particles and binder so as to generally, provide as low as about 0.5 mg, preferably, about 0.75 mg to about 6.0 mg, and most preferably, about 1.0 mg to about 4.0 mg per square centimeter of catalyst on the carbon fiber paper. In addition, by coating in slurry form an aqueous mixture of metal catalyst particles and binder, utilizing such coating means as a metering bar, a metering knife or rod, or spray application, an extremely uniform coating can be obtained. This coating method which is suitable for automation provides a coating which is uniform across the surface of the substrate, thus allowing the production of reproducibly uniform performance characteristics in the completed fuel cell electrode.

In one embodiment of the electrode of the invention, the proportion, by weight, of catalyst particles to binder generally is in the ratio of about 96% catalyst/4% binder to about 85% catalyst/15% binder preferably, about 96% to about 88% catalyst to about 4% to about 12% of hydrophobic binder resin. Usually the coatings of catalyst and binder are built up upon one side of a wet proofed carbon fiber paper substrate by application of the metal catalyst particle/binder aqueous mixture in the form of a slurry. Subsequent to the application and drying of the aqueous mixture of metal catalyst particles and binder, the assembly on the carbon fiber paper is heated at a temperature of 275° C.–350° C. to sinter the binder and, thereafter, the completed electrode can be assembled to form a membrane and electrode assembly by bonding the coated side of the wet proofed carbon fiber paper to an ion exchange membrane utilizing elevated temperature and/or pressure.

While the electrodes of the invention are particularly suitable for use in fuel cells, the electrodes are also useful in electrolytic cells, such as, for the production of chlorine and caustic and in the generation of hydrogen and oxygen in water electrolysis cells. A hydrophilic binder can be utilized in the metal particle/binder coating in the preparation of the electrode for use in certain electrolytic cells.

Although a number of different types of electrode structures in the prior art are suitable for use in fuel cells, each electrode, for optimum performance in the cell, should be one which is electronically conductive, is capable of gas diffusion, i.e., will adsorb the fuel or oxidant employed, contains a catalyst for the electrode reaction, and will not itself oxidize severely under the operating conditions of the cell.

Suitable gas adsorbing metals are well known and many are described for example in "Catalysts, Inorganic and Organic", Berkman, Morrel and Egloff, Reinhold Publishing Co., New York (1940); "Catalytic Chemistry", H. W. Lonse, Chemical Publishing Co., Inc., New York (1945); etc. Suitable materials, generally include at least one of the metals of Group VIII series of metals of the Periodic Table Of The Elements, preferably, the noble metals, for instance, rhodium, ruthenium, palladium, osmium, iridium, and platinum (platinum black). The Periodic Table of the Elements referred to above is that which is published in the 52nd edition of The Handbook of Chemistry and Physics, Chemical Rubber Company (1971-1972). Other less suitable metals for forming electrodes include the other metals of Group VIII, e.g., nickel, iron, and cobalt, as well as other metals known to catalytically adsorb gases, e.g., silver, copper and metals of the transition series, e.g., manganese, vanadium, rhenium, etc.

Since the adsorption of gases on solids is a surface phenomena, it is desirable that the electrodes be of the maximum practicable surface area and that the surface of the metal particles preferably be in its most active state for the adsorption of gases. For maximum cell efficiency, the maximum permissible area of one side of each electrode should be in complete contact with the aqueous electrolyte and the maximum permissible surface of the other side of each electrode should be in contact with the fuel or oxidant gas. For these reasons, finely divided metal catalyst powders are preferred which have highly developed surface areas, for example, at least 10 square meters per gram, and generally up to 100 square meters per gram. Mixtures of two or more metal catalysts may also be used. For maximum cell performance, preferably, the electrodes are made using the very active noble metals of the Group VIII metals, for example, platinum black, palladium black, Raney nickel, etc. Use of the noble metals of the Group VIII series of metals have the further advantage in that electrode corrosion is avoided when the electrolyte is an acid. Acid electrolytes cause corrosion conditions at both the anode and cathode which shorten the life of the cells having electrodes incorporating metals such as nickel, iron, copper, etc. The corrosive effect is not as pronounced in fuel cells using bases as the electrolyte. Long fuel cell life may be obtained by using any metals which are resistant to bases, for example, the Group VIII metals, including nickel, cobalt, etc., as well as other known gas adsorbing metals, e.g., rhenium, in cells having an aqueous base electrolyte. The choice between these materials is affected by design considerations, intended use, desired lifetime, gases used for fuel and oxidant, etc.

In the preparation of one embodiment of the electrode of the invention, a subassembly consisting of a coating of catalytic metal particles and a binder on a wet proofed carbon fiber paper is first prepared. In the preparation of an electrode for an electrolytic cell, an aqueous emulsion of a hydrophobic resin, such as, a fluorinated hydrocarbon resin, such as, polytetrafluoroethylene is mixed with sufficient metal particles so that the layer prepared from this mixture is electronically conductive, for example, about 2–25 grams of finely divided platinum black per gram of polytetrafluoroethylene solids in dispersion form is used.

In contrast to prior art methods of forming catalytic layers on carbon filter paper substrates in the preparation of electrodes, it has been found most desirable to utilize the mixture of the catalytic metal particles and binder in slurry form rather than in coagulated form. The advantage of the use of the slurry in forming the catalytic layer of the electrode is that this procedure allows the use of coating methods which can be automated for mass production of the electrode. In addition, such coating methods provide uniform coating layers which provide reproducible results in the electrodes produced by the process of the invention. The slurry coating is dried so as to remove water and the catalytic coating on the carbon fiber paper is heated so as to sinter the binder, preferably at a temperature of about 275° to 350° C. for 2 to 10 minutes. Thereafter, a membrane and electrode assembly is formed by bonding an ion exchange membrane to the coated side of the wet proofed carbon fiber paper. Bonding can take place at a temperature, generally, of about 175° C. and about 500 pounds per square inch pressure, preferably, about 150 to about 180 degrees centigrade and about 300 to about 800 psi. Thereafter, the membrane and electrode assembly is cut to the desired shape.

The current collecting grid of the electrodes of the invention is formed of a carbon fiber paper. Carbon fiber papers suitable for use as the coating substrate in the present invention can be purchased or prepared. Suitable carbon papers are available from a number of commercial sources, for example, Union Carbide Corporation, Stackpole Carbon Company and Kureha Corporation. Carbon fiber paper substrates can be prepared from resin bonded carbon fibers by known paper making techniques, as disclosed in U.S. Pat. No. 3,972,735. Such carbon papers are generally, wet proofed by impregnation with a solution or dispersion of a hydrophobic polymer prior to coating with a catalyst-binder aqueous mixture. The wet proofing treatment allows gas flow through the carbon fiber paper substrate in the presence an aqueous liquid.

A preferred method for preparing carbon paper substrates is the process taught in U.S. Pat. No. 4,426,340, the disclosure of which is incorporated herein by reference. Briefly, the process of the '340 patent for formation of the carbon fiber paper comprises selecting a dry mixture of carbon fibers and thermosetting resin, depositing the mixture in a mold, and then heating and compacting the mixture to bond the fibers. The article so formed is then carbonized in an inert atmosphere by increasing the temperature at a rate of about 40° C. per hour to 950° C. and holding at 950° C. for about one hour. The substrate can be graphitized by heating at 2800° C.

The process of the invention for the production of an electrode provides considerable latitude in the design of electrode substrates and allows selection of porosity and pore sizes that are adapted to specific applications. In general, it is desirable to maximize the porosity of the substrate while preserving the physical strength of the substrate. Carbon fiber paper substrates having a porosity of between 65% and 80% are preferred with a porosity between 70% and 80% being most preferred for the practice of the present invention. The selection of a particular pore size distribution depends upon the design of the particular cell and may be determined by conventional fuel cell design techniques. A mean pore size, generally, of about 10 microns to about 90 microns is suitable. A mean pore size of 20 microns to about 70 microns is preferred for the practice of the present invention.

The catalytically active metal particles, whether used in the preparation of anode or cathode electrodes are, generally finely divided and have a high surface area. For example, in the case of an oxygen or hydrogen electrode fuel cell, platinum black (surface area greater than 25 sq. meters per gram) or high surface area (800 to 1800 sq. meter per gram) platinum on activated carbon powder (average particle size 10 to 30 microns) are suitable for use in the preparation of an electrode which is to serve as the anode or the cathode. In the case of a chlorine cell, an electrode can be prepared in which ruthenium dioxide particles are prepared by thermal decomposition of ruthenium nitrate for 2 hours at 450° C. The resulting oxide can then by ground to a fine particle size using a mortar and pestle and the portion of the ground material which passes through a 325 mesh sieve (less than 44 microns) can be used to prepare an electrode of the invention.

The hydrophobic polymer for use in wet proofing the carbon fiber paper and as a binder for the catalytic metal particles which are coated on the carbon fiber paper substrate generally, can be any hydrophobic polymer compatible with the electrolyte to be used in the fuel cell or other electrochemical cell. Compatible flourinated hydrocarbon polymers such as polytetrafluoroethylene and flourinated ethylene propylene, having molecular weights of about $1 \times 10^6$ or greater are preferred. Polytetraflourethylene is most preferred and is most widely used as a binder in this technology. Particularly preferred for use in preparing the electrodes of the invention is the aqueous dispersion of polytetrafluoroethylene sold under the trade designation T-30 by DuPont having a particle size of about 0.2 microns.

The solid polymer electrolyte matrices, ion exchange membranes or sheets which make up the base member of the membrane and electrode assemblies of the present invention, are well known in the art. Typical solid polymer electrolyte ion exchange membranes are described in U.S. Pat. No. 4,478,695, U.S. Pat. No. 4,171,253, U.S. Pat. No. 4,470,889 and U.S. Pat. No. 3,134,697, each incorporated by reference. The solid polymer electrolyte membranes or sheets are composed of resins which include in their polymeric structure ionizable radicals, one ionic component of which is fixed or retained by the polymeric matrix with at least one ion component being a mobile replaceable ion electrostatically associated with the fixed component. The ability of the mobile ion to be transported and/or replaced under appropriate conditions with other ions imparts ion exchange characteristics to these materials. The ion exchange resin membranes can be prepared by polymerizing a mixture of polymerizable ingredients, one of which contains a precursor of an ionic constituent.

Two broad classes of cation exchange resins are the so-called sulfonic acid cation exchange resins and carboxylic acid cation exchange resins. In the sulfonic acid membranes, the cation ion exchange groups are hydrated sulfonic acid radicals which are attached to the polymer backbone by sulfonation. In the carboxylic acid resins, the ion exchanging group is —COO—. The ion exchange resins may also be in various salt forms such as the sodium salt and the potassium salt.

In the anion exchange resin membranes, the ionic group is basic in nature and may comprise amine groups, quarternary ammonium hydroxides, the guanidine group, and other nitrogen-containing basic groups. In both the cation and anion exchange resin membranes, that is, where the ionic groups are acidic groups (cationic membranes) or where the ionic groups are basic (anionic membranes), the ionizable group is attached to a polymeric compound, typical examples of which are a phenol-formaldehyde resin, a polystyrene-divinyl-benzene copolymer, a urea-formaldehyde resin, a melamine-formaldehyde resin, and the like. The formation of these ion exchange resins into membranes or sheets is also well known in the art. In general, they are of two types, (1) the heterogeneous type, in which granules of ion exchange resin are incorporated into a sheet-like matrix of suitable binder, for example, a binder of polyethylene, polytetrafluoroethylene, or polyvinyl chloride, and (2) the continuous or homogeneous ion exchange resin membrane in which the entire membrane structure has ion exchange characteristics. These membranes are commercially available. A typical example of a commercially available cationic, sulfonated perfluorocarbon membrane is the membrane sold by E.I. Dupont de Nemours & Co. under the trade designation NAFION ®. This commercial membrane is more particularly described as one in which the polymer is a hydrated copolymer of polytetrafluoroethylene (PTFE) and polysulfonyl flouride vinyl ether containing pendant sulfonic acid groups. The sulfonic groups are chemically bound to the perfluorocarbon backbone through a long side chain and the membrane is hydrated before use in the cell by soaking it in water, preferably at the boil for 10–60 minutes. A membrane having 30% to 35% water of hydration, based upon the dry weight of membrane, is obtained.

A preferred class of ion exchange membranes having sulfonic acid functional groups are those described in U.S. Pat. Nos. 4,478,695 and 4,470,889, assigned to the Dow Chemical Company, incorporated herein by reference. These materials, on an equivalent weight basis, generally hydrate less, when immersed in water at the boil, in accordance with prior art hydration procedures, than the sulfonated perfluorocarbon membranes sold under the trade designation NAFION.

The general structure of the NAFION permselective membranes is characterized as having the functional sulfonic acid groups at the end of long pendant chains attached to the polymer backbone. In contrast, those materials of the latter referenced patents have shorter chain pendant groups for attachment of the sulfonic acid functional groups. It is believed that this structural difference accounts for the absorption of less water of hydration in these ion exchange membranes when the same concentration of functional groups is present, as indicated by equal equivalent weight, in the polymer, as compared with the NAFION ion exchange membranes. As indicated above, concentration of the functional groups in the ion exchange polymer membrane is measured in the prior art by equivalent weight. This is defined by standard acid-base titration as the formula weight of the polymer having a functional group in the acid form required to neutralize one equivalent of base.

Generally the ion exchange membrane is hydrated prior to use in the electrolytic cell and subsequent to bonding to the electrodes of the invention. A typical procedure for the hydration of an ion exchange membrane or solid polymer electrode assembly is as follows. The membrane, prior to use, is first converted from the salt form to the proton form. The salt form (usually the sodium or potassium salt) is thus converted by placing it in a strong acid solution, such as sulfuric acid. The membrane is subsequently washed and boiled. Water of hydration is incorporated into the membrane by boiling the membrane.

A method of generating an electric current is also contemplated comprising feeding streams of a fuel gas and an oxidant gas to a fuel cell, said fuel cell having at least two electrodes and an electrolyte-containing matrix between said electrodes, each electrode having a catalytic metal layer comprising a catalytic metal particle binder coating on one surface of a carbon fiber paper and bonded to said matrix on the opposite surface of said carbon fiber paper, wherein said catalytic metal particle layer comprises a hydrophobic binder resin and wherein said catalytic metal particles are present in the amount of about, 2 to about 25 catalytic metal particles per part of binder. The improvement in such method comprises oxidizing a fuel at the catalyst layer of one electrode to generate a stream of electrons, conducting the electrons to a second electrode, combining the electrons with said oxidant at the catalyst layer of the second electrode, and transferring ionic species through the electrolyte to complete the circuit. In such method, the electrodes exhibit superior voltage characteristics as the result of preparing said catalytic layer by coating an aqueous dispersion of said hydrophobic binder resin and said catalytic metal particles utilizing spray application, a metering bar, metering knife, or metering rod and thereafter heating said carbon fiber paper and said catalytic metal layer to a temperature at or above the melting temperature of said hydrophobic polymer but below the decomposition temperature thereof.

The following examples illustrate the various aspects of the invention but are not intended to limit its scope. When not otherwise specified throughout this specification and claims, temperatures are given in degrees centigrade and parts, percentages, and proportions are by weight.

EXAMPLE 1

One embodiment of the electrode of the invention is prepared by depositing onto one side of a carbon paper fiber substrate an electrocatalytic catalyst and, thereafter, bonding to the same side of said substrate an ion exchange membrane.

Prior to coating with a catalyst layer, a carbon fiber paper 10–20 mils in thickness, sold under the trade name PC-206 by the Stackpole Fibers Company, is wet proofed utilizing an aqueous dispersion of polytetrafluoroethylene, sold under the tradename Teflon T-30. The carbon fiber paper can be coated or impregnated with the Teflon T-30 dispersion. The coated or impregnated paper is dried under a heat lamp utilizing mild heat and, thereafter, dried in an oven at a temperature of 110° C. for 30 minutes. The Teflon T-30 coated paper is, thereafter, sintered in an oven held at a temperature of 325° C. utilizing a heating period of about 30 minutes.

After cooling the paper, the catalyst layer is applied using an uncoagulated mixture of Teflon T-30 and platinum black having an approximate composition of 0.176 grams of Teflon T-30 dispersion per gram of platinum black. The coating is applied utilizing a number 40 Mayer coating rod to spread the mixture utilizing about 4 passes of the rod over the paper. The coated electrode layer is dried under a heat lamp utilizing a mild heat and, thereafter, the electrode coated paper is heated in an oven held at a temperature of 100° C. while purging the oven atmosphere with an inert gas (nitrogen). After 10 minutes of heating at 100° C., the oven is raised to a temperature of 325° C. and the catalyst layer is heated at this temperature for a period of 5 to 10 minutes.

After cooling, a membrane and electrode assembly is prepared in which the electrode is bonded to an ion exchange membrane of 800 equivalent weight and 0.004 inch thickness in accordance with the following procedure. The ion exchange membrane is sandwiched between the coated sides of two layers of the catalytic layer coated carbon fiber paper prepared above. External to this sandwich there are placed additional sandwich layers of a release paper impregnated with polytetrafluoroethylene. Overlaying each of these layers are respectively a first layer of a sheet of a silicon rubber of low Durometer, typically about 50 Durometer, and a rigid metal sheet having a thickness of about ¼ inch. The assembly is, thereafter, placed in a flat platen press at ambient temperature and the pressure is increased to 500 pounds per square inch and the temperature is increased to about 175° C. At these conditions, the sandwich is maintained for a period of 5 minutes and then the assembly is cooled under pressure and removed when the assembly has reached a temperature of about 50° C. The final membrane and electrode assembly is, thereafter, placed in a sealed container which contains a small amount of deionized water.

EXAMPLE 2 (Control-forming no part of this invention)

An electrode is prepared essentially in accordance with the process described in *Techniques of Electrochemistry*, volume 3, edited E. Yeager and A. J. Salkind, pages 274–275 (1978), incorporated herein by reference.

Utilizing a similar concentration of Teflon T-30 and platinum black, as in Example 1, a coagulum is prepared by continued stirring of the slurry or heating, or the addition of a few drops of isopropyl alcohol. The coagulum is placed upon a metal foil substrate (niobium or aluminum) and rolled out to the proper dimensions. After the coagulum has been spread onto the surface of the substrate, the electrode layer so formed is sintered in a nitrogen atmosphere in an oven held at a temperature of 325° C. After 10 minutes of heating, the catalyst layer is removed from the metal foil and, thereafter, bonded to an ion exchange membrane and carbon fiber paper, in accordance with the procedure described in Example 1. Alternatively, the coagulum can be coated onto a piece of wet proofed carbon fiber paper, as was used in Example 1. The metal foil or wet proofed carbon fiber paper can be coated with the coagulum to the desired thickness and uniformity utilizing a glass rod. A typical coating thickness is approximately 1–3 mils. This procedure is a minor modification of the process described on pages 274 and 275 of the Yager et al (editor) reference cited above in that in the procedure of this example, the catalyst (platinum black) is not utilized in conjunction with a supporting material such as active carbon.

The electrodes of Examples 1 and 2 were evaluated in a fuel cell constructed generally in accordance with that described in Aircraft Equipment Division Report LANL-29, entitled *Interim Report, New Membrane Catalyst for Solid Polymer Electrolyte Systems*, P.O. No 9-X53-D6272-1, by R. J. Lawrence of the General Electric Company incorporated herein by reference. A comparison of the electrodes was made under polarization conditions as follows: The electrode of Example 1 provided an open circuit potential of 1.06 volts, 0.927 volts at 100 amps per square foot, and 0.851 volts at 500 amps per square foot. The electrode of Example 2 when tested similarly, provided an open circuit voltage of 1.00 volts, 0.884 volts at 100 amps par square foot, and 0.75 volts at 500 amps per square foot. The electrodes were tested at 85° C. utilizing 40 pounds per square inch guage of hydrogen and 60 pounds per square inch gauge of oxygen pressure. The ion exchange membrane utilized to bond to the coated side of the carbon fiber paper catalytic layer coating was characterized as an 800 equivalent weight ion exchange membrane having a thickness of 0.004 inch.

The embodiments of the invention in which an exclusive property or privilege is claimed are defined as follows:

1. A process for producing an electrode comprising:
   (A) preparing a uniformly coated carbon fiber paper by applying an uncoagulated aqueous mixture consisting essentially of catalytic metal particles and a hydrophobic or hydrophilic resin binder to one side of a wet proofed carbon fiber paper, wherein said carbon fiber paper is wet proofed by coating or impregnation with a hydrophobic polymer and said catalytic metal particles are present on said coated carbon fiber paper in the amount of about 2 to about 25 parts by weight of said metal particles per part of said resin and
   (B) heating said coated carbon fiber paper to a temperature of 275°–350° C. to sinter the binder.

2. The process of claim 1, wherein said aqueous mixture consisting essentially of said catalytic metal particles and said hydrophilic or hydrophobic resin is coated on said wet proofed carbon fiber paper from an aqueous dispersion utilizing spray, metering bar, knife, or metering rod application means.

3. The process of claim 2, wherein said coated, wet proofed carbon fiber paper is prepared by application thereto of said aqueous dispersion in an automated coating process.

4. An electrode for an electrochemical cell comprising a solid polymer electrolyte membrane bonded to the coated side of a wet-proofed carbon fiber paper, said coated side having a uniform coating prepared by coating said side with an uncoagulated, aqueous mixture consisting essentially of catalytic metal particles and a hydrophilic or hydrophobic resin binder, wherein said catalytic metal particles are present in said coating in the amount of about 4 to about 25 parts by weight of said catalytic metal particles per part of hydrophilic or hydrophobic resin.

5. The electrode of claim 4, wherein said electrode is prepared by the process comprising:
   (A) applying a catalytic layer consisting essentially of an uncoagulated aqueous mixture of catalytic metal particles and an hydrophobic or hydrophilic resin binder to one side of a wet proofed carbon fiber paper utilizing spray, metering bar, metering knife, or metering rod application means and
   (B) heating said catalytic layer to a temperature of 275° C.–350° C. to sinter the binder.

6. The electrode of claim 5, wherein said hydrophobic resin binder is a fluorinated hydrocarbon resin and wherein said catalytic metal particles comprise at least one of the metals of the group VIII series of metals in the Periodic Table of the Elements.

7. The electrode of claim 6, wherein said metal is platinum black and said fluorinated hydrocarbon resin is polytetrafluoroethylene.

8. A gaseous fuel cell comprising an aqueous electrolyte positioned between and in direct electrical contact with a pair of gas diffusion hydrophobic, electrically conductive electrode elements, each of said electrode elements consisting essentially of a coated, wet proofed carbon fiber paper, wherein said paper is prepared by uniformly coating on one side with an uncoagulated aqueous mixture comprising catalytic metal particles and a hydrophobic resin binder, said metal particles and said hydrophobic resin being present in a coating on said paper on a weight basis, of about 2 to about 25 metal particles per part of hydrophobic resin, means for supplying a fuel gas to one of said electrode elements, and means for supplying an oxidant gas to the other of said electrode elements.

9. The fuel cell of claim 8, wherein said coating is applied as an uncoagulated, aqueous dispersion to said wet proofed carbon fiber paper utilizing spray, metering bar, metering knife, or metering rod means.

10. The fuel cell of claim 9, wherein said coated wet proofed carbon fiber paper is bonded on the coated side to an ion exchange membrane under elevated temperature and/or pressure conditions.

11. The fuel cell of claim 10, wherein said wet proofed carbon fiber paper is coated with a mixture comprising a fluorinated hydrocarbon binder and metal particles, said metal comprising at least one of the metals of the group VIII series of metals in the Periodic Table of the Elements.

12. The fuel cell of claim 11, wherein said metal is platinum black and said fluorinated hydrocarbon resin binder is polytetrafluoroethylene.

13. A membrane/electrode assembly comprising:
(A) an electrically conductive, wet-proofed carbon fiber paper having a single, uniformly coated side wherein the coating on said side is prepared by coating said side with an uncoagulated, aqueous mixture consisting essentially of catalytic metal particles and a hydrophobic or hydrophilic resin binder, said metal particles and resin binder being present in the amount of about 2 to about 25 parts by weight of said metal particles per part of hydrophobic or hydrophilic resin and
(B) an ion exchange membrane bonded to said coated side of said wet-proofed carbon fiber paper.

14. The assembly of claim 13, wherein said uncoagulated mixture consists essentially of an aqueous dispersion of a hydrophobic fluorinated hydrocarbon and said catalytic metal particles wherein said catalytic metal particles are selected from at least one of the metals of group VIII series of metals in the Periodic Table of the Elements.

15. The assembly of claim 14, wherein said fluorinated hydrocarbon resin binder is polytetrafluoroethylene and wherein said catalytic metal particles are platinum black.

16. A method of generating an electric current comprising feeding streams of a fuel gas and an oxidant gas to a fuel cell, said fuel cell having at least two electrodes and a catalytic metal coating layer on one side of said electrodes and an electrolyte-containing matrix between said electrodes, said coating consisting essentially of a catalytic metal particle and binder and coated on a wet proofed carbon fiber paper wherein said binder comprises a hydrophobic polymer, said method comprising:
(A) oxidizing a fuel at the catalytic metal particle and binder coating of one electrode to generate a stream of electrons,
(B) conducting the electrons to a second electrode,
(C) combining the electrons with said oxidant at the catalytic metal particle and binder coating of the second electrode, and
(D) transferring ionic species through the electrolyte to complete the circuit,
wherein said electrodes are prepared by applying a coating to said carbon fiber paper from an uncoagulated slurry of said hydrophobic polymer and said catalytic metal particles, said coating being uniformly applied by utilizing spray, metering bar, metering knife, or metering rod application means and, thereafter, heating said carbon fiber paper and said catalytic metal coating layer to a temperature of 275° C.–350° C. to sinter the binder.

17. The method of claim 16, wherein said slurry is an aqueous dispersion, said hydrophobic resin is a fluorinated hydrocarbon resin, said catalytic metal particles are selected from at least one of the metals of group VIII series of metals in the Periodic Table of the Elements, and said matrix is an ion exchange membrane.

18. The method of claim 17, wherein said fluorinated hydrocarbon resin binder is polytetrafluoroethylene, said catalytic metal particles are platinum black, and said ion exchange membrane is a cationic ion exchange membrane.

19. An assembly for bonding a membrane and electrode assembly at elevated temperature, said assembly comprising:
(A) a membrane and electrode assembly comprising an ion exchange membrane sandwiched between the coated sides of two layers of a carbon fiber paper coated with a catalytic layer, said coated sides having a uniform coating prepared by coating said sides with an uncoagulated aqueous mixture consisting essentially of catalytic metal particles and a hydrophilic or hydrophobic resin binder wherein said catalytic metal particles are present in said coating in an amount of 2 to about 25 parts by weight of said catalytic metal particles per part of hydrophilic or hydrophobic resin,
(B) sandwiched layers of a release paper impregnated with polytetraflourethylene, each of said layers positioned externally to said membrane and electrode assembly, and
(C) overlaying layers of a silicone rubber sheet on said release paper, each of said silicone rubber layers overlayed with a rigid metal sheet.

20. The assembly of claim 19 wherein said membrane and electrode assembly comprises:
(A) an electrically conductive, wet proofed carbon fiber paper having a single, uniformly coated side prepared by coating said side with an uncoagulated, aqueous mixture consisting essentially of catalytic metal particles and a hydrophobic or hydrophilic resin binder, said metal particles and resin binder being present in an amount of about 4 to about 25 parts by weight of said metal particles per part of hydrophobic or hydrophilic resin and
(B) an ion exchange membrane bonded to said coated side of said wet proofed carbon fiber paper.

21. The assembly of claim 20 wherein said uncoagulated mixture consists essentially of an aqueous dispersion of a hydrophobic fluorinated hydrocarbon and said catalytic metal particles wherein said catalytic metal particles are selected from at least one of the metals of the group VIII series of metals in the Periodic Table of the Elements.

22. The assembly of claim 21 wherein said fluorinated hydrocarbon resin binder is polytetrafluoroethylene and wherein said catalytic metal particles are platinum black.

* * * * *